April 9, 1929.   W. C. WRIGHT   1,708,858
WEIGHTING MACHINE
Filed Feb. 26, 1927   2 Sheets-Sheet 1

Inventor
Wallace C. Wright
by James R. Hodder
Attorney

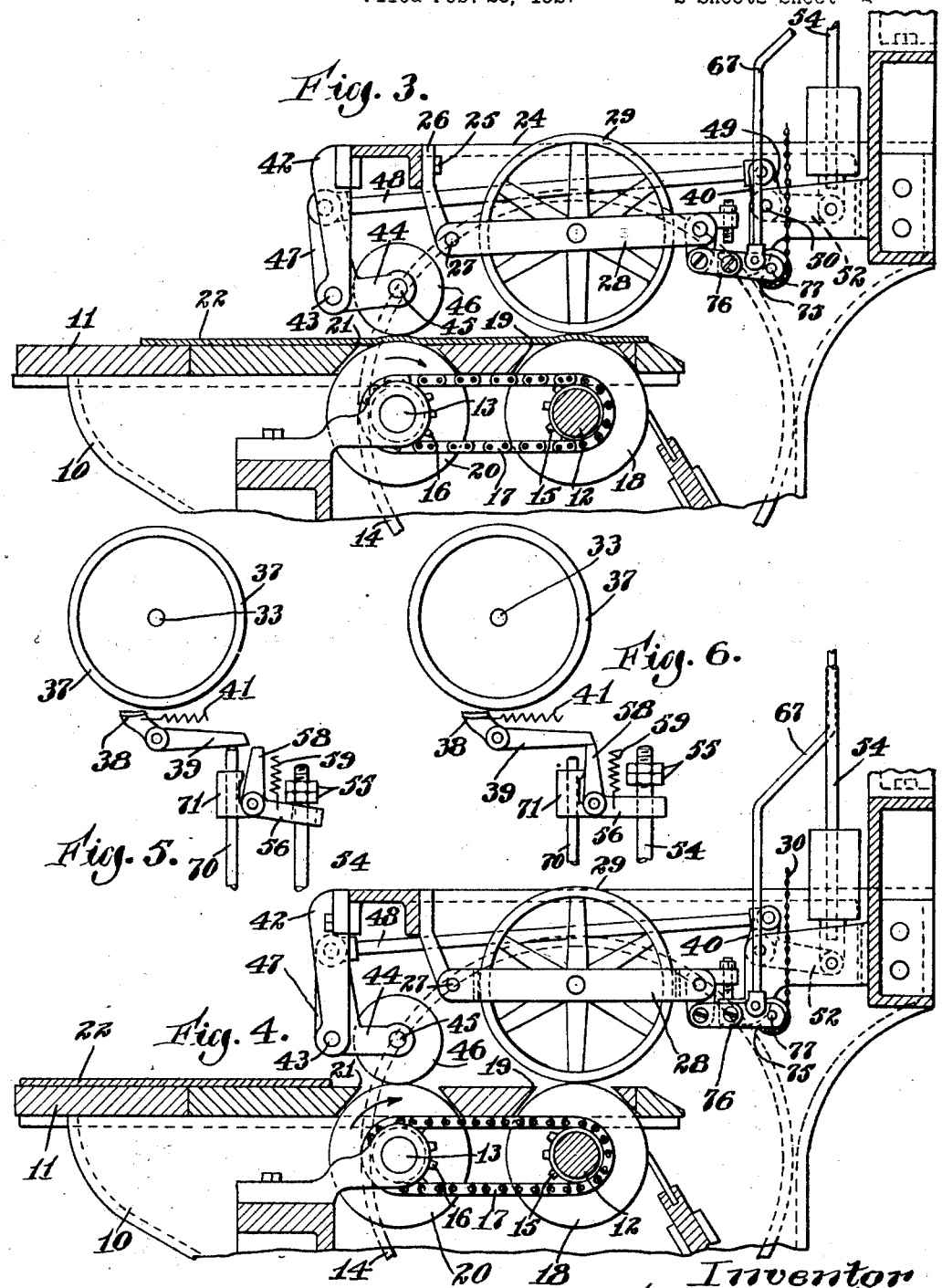

Patented Apr. 9, 1929.

1,708,858

UNITED STATES PATENT OFFICE.

WALLACE C. WRIGHT, OF BROOKFIELD, NEW HAMPSHIRE, ASSIGNOR TO HARDING-WALCOTT COMPANY, OF SALEM, MASSACHUSETTS, A CORPORATION OF MASSACHUSETTS.

WEIGHTING MACHINE.

Application filed February 26, 1927. Serial No. 171,287.

My present invention relates to weighting machines and more particularly to an improved brake locking and releasing means for indicating dials forming part of weighting machines.

In the co-pending application of Dana E. Harding for improved weighting machine, Serial No. 732,070, is disclosed and claimed a weighting machine for visually indicating the average weight or thickness of a hide or skin or other flexible material of uneven thickness and of irregular contour, and the present invention is adapted to be incorporated in and associated with the mechanism described and claimed in said Harding application. It is important in such machine that the indication of the average weight or thickness be retained for a predetermined length of time in order that either the average weight or thickness may be manually marked or indicated on the hide or skin so measured or to allow time for the automatic marking of such indication by appropriate mechanism. It is also important that the indicating mechanism, after being retained in locked or set position for a predetermined length of time, be released from such position in order that it may return to normal or inoperative position before the next succeeding hide or skin passes through or into the machine. Various methods have been suggested for performing this operation, the majority of such depending on the insertion into the machine of the next succeeding hide or skin to release the indicator. Where the machine operates rapidly, there is, however, insufficient time within which the indicating mechanism may be returned to normal before the indicator is again pressed into service to register the average thickness or weight of the hide. Such devices are, therefore, not successful and are being rapidly discarded.

My present invention obviates the difficulties encountered in prior machines, and in carrying out my invention, I am enabled to operate the brake mechanism both locking and releasing by the same skin as it passes through the machine. That is, with my device I am enabled to lock the indicating mechanism in operated or set position by a hide as it passes into the machine and after the averaging operation has been performed and when such hide or skin passes out of the machine, such hide or skin controls the mechanism whereby a locking device is released. Such mechanism allows ample time under all conditions of operation of the machine and regardless of how rapidly the machine works to permit the indicating mechanism to return to normal or inoperative position before the next hide or skin has reached such a point as to act on the indicating mechanism.

The principal object of my invention, therefore, is an improved weighting machine.

Another object of my invention is an improved dial control means.

A further object of my invention is an improved locking and releasing means for indicating dials of weighting machines.

Other objects and novel features of the construction and arrangement of parts comprising the device will appear as the description of the invention progresses.

In the accompanying drawings illustrating preferred embodiments of my invention, Fig. 1 is a front elevation, partly in section, of the upper or indicating portion of a leather weighting machine;

Fig. 3 is a view similar to Fig. 2 but showing a further modification of my invention;

Fig. 4 is a view similar to Fig. 3 but showing the parts in a different position, and Figs. 5 and 6 are detail views of the brake mechanism.

Figures 1, 2:
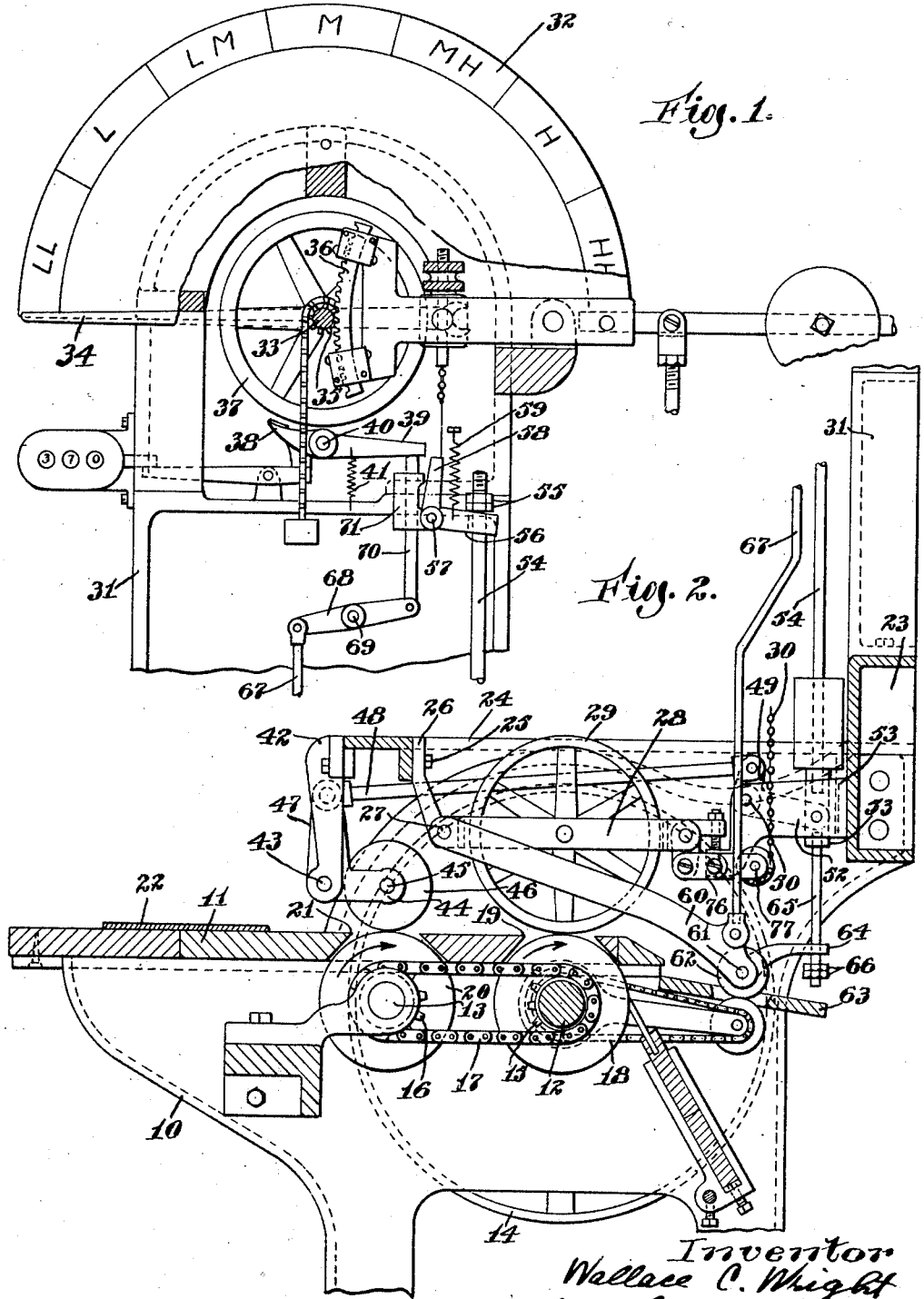
Fig. 2 is a side elevation partly in section of a weighting machine showing one modification of my invention.

Referring to the drawings, and particularly to Figs. 1 and 2, 10 designates the base of the machine on the top of which is mounted the platform 11. Rotatably mounted on the base are parallel shafts 12 and 13, the shaft 12 being the main drive shaft and having secured at one end thereof a pulley 14 and by means of which power is transmitted to the shaft 12 by any suitable source. On the shafts 12 and 13 and in alinement with each other are sprockets 15 and 16 respectively, over which runs an endless sprocket chain 17 and the sprockets 15 and 16 being of equal diameter and pitch, the shaft 13 is made to rotate at the same speed and in the same direction as the shaft 12, the direction of the rotation of such shafts being indicated by the arrow in the figures. Secured to the shaft 12 is a roller 18 that extends upward through an opening 19 in the top 11 and secured to the shaft 13 is a roller 20 that extends upward through an opening 21 in the top 11. The rollers 18 and 20 are of the same diameter and the upper portion thereof lies slightly above the top surface of the table 11 so that a hide or skin 22 on the table 11 being pushed from left to right on the said table will have its own surface engaged by the rolls 20 and 18 in succession. Secured at the rear of the base 10 and extending upwardly therefrom is a member 23 that has secured to and extending forwardly therefrom a member 24. Secured to the member 24 by bolts 25 are downwardly and rearwardly extending brackets 26, to the lower end of which is secured a shaft 27. Rotatably mounted on the shaft 27 and extending rearwardly, are a plurality of frames 28 (only one of which is shown) and in each of the brackets 28 is rotatably mounted a wheel 29. The wheels 29 and frames 28 are interconnected together by means of chains 30 which average the total rise of the frames 28 because of the passage of a hide or skin 22 between the rolls 18 and the plurality of wheels 29. This particular feature of the device is clearly explained in the copending application of Dana E. Harding above referred to. Mounted on the member 23 and extending upwardly therefrom is a member 31 carrying at its top an indicating dial 32, and also a shaft 33, on which is mounted the indicating hand 34 which is associated with the dial 32. On the shaft 33 is a pinion 35 meshing with an arcuate rack 36 and by means of which the shaft 33 is rotated. The arcuate rack 36 is operated in the usual manner by the averaging mechanism connected to the chains 30. Secured to the shaft 33 is also a wheel 37 and associated with the wheel 37 is a brake device 38 forming part of a lever 39 rotatably mounted on a shaft 40, such lever 39 having a tendency to rotate in a clockwise direction by means of a spring 41 and thus bring the brake 38 into engagement with the wheel 37.

Secured to the front end of the member 24 and extending downwardly therefrom, is a bracket 42 and secured to the lower end of the bracket 42 is a shaft 43. Rotatably mounted on the shaft 43 is a bell crank lever, one arm 44 of which is provided with a shaft 45, on which is rotatably mounted a roller 46 normally in engagement with the roll 20 on the shaft 13, and the other arm 47 of such bell crank lever has pivotally secured thereto the forward end of a connecting rod 48. This connecting rod extends rearwardly and has pivotally attached to its rear end the end of an arm 49 of a bell crank lever. The bell crank lever 49 is rotatably mounted on a shaft 50 that in turn is mounted in a bracket 51. The bracket 51 is secured to the front face of the member 23. The other arm 52 of this bell crank lever is pivotally attached to a plate 53, such plate having connected to its upper end the lower end of a vertically slidable rod 54. The upper end of this rod 54 is threaded and the threaded end is provided with adjusting nuts 55, as clearly shown in Fig. 1, and also the upper end of this rod 54 passes through a perforation in one arm 56 of a bell crank lever that is pivotally mounted on a shaft 57 on the member 31. The other arm 58 of the bell crank lever referred to constitutes a latch adapted to engage with the free end of the lever 39 remote from the brake portion 38. The bell crank lever comprised of the arms 56 and 58 is urged in a counter-clockwise direction about the shaft 57 by means of a spring 59.

Rotatably mounted on the shaft 27 and extending rearwardly and downwardly therefrom is an arm 60 which has, at its rear end, a shaft 61 on which is rotatably mounted a roller 62, this roller normally extending into a perforation in a plate 63 located parallel to and adjacent the rear end of the platform or top 11. Secured to the arm 60 and extending rearwardly therefrom is an arm 64 perforated to allow free sliding movement of a rod 65 that is secured at its upper end to the plate 63. The lower end of this rod 65 is threaded to receive adjusting nuts 66. Pivotally attached to the arm 60 and extending upwardly therefrom is a rod 67 that has pivotally attached to its upper end one end of a lever 68. The lever 68 is pivotally mounted on a shaft 69 in the member 31. Pivotally attached to the other end of the lever 68 and extending upwardly therefrom is a rod 70, this rod being slidably mounted in a member 71 on the member 31 and the upper end of the rod 70 is adapted to engage with the under surface of the free end of the lever 39 and at the proper instant will cause a rotative movement of the lever 29 about its shaft 40 in a counter-clockwise direction and against the tension of the spring 41, thereby releasing the brake portion 38 from the wheel 37.

When the parts of the device illustrated in Figs. 1 and 2 are in the normal or inoperative position, the roll 46 being in engagement with the roll 20, the bell crank lever comprising the arms 49 and 52 will be rotated in a clockwise direction and the rod 54 will be moved into its lowermost position, whereupon the adjusting nuts 55 will engage with the arm 56 of the bell crank lever and will cause the latch arm 58 thereof to be moved to the right clear of the lever 39 and against the tension of the spring 59. Also the roll 62 dropping into the perforation in the plate 63 will allow the lever or arm 60 to move into its lowermost position, thereby pulling the rod 67 downward and rotating the lever 68 in a counter-clockwise direction, thereby moving the rod 70 upward into engagement with the lever 39 and moving such lever 39 in a counter-clockwise direction so as to free the brake portion 38 thereof from the wheel 37. The indicating mechanism, including the indicating hand 34, is, therefore, free to resume its normal position, in this instance the normal position being that indicated by the designation LL in Fig. 1. When a hide or skin 22 is fed into the machine, it first passes between the rolls 46 and 20 and when this happens, the bell crank lever, comprised of the arms 44 and 47, rotates in a counter-clockwise direction, moving the connecting rod 48 to the left, as viewed in Fig. 2, rotating the bell crank lever, comprised of the arms 52 and 49, in a counter-clockwise direction and moving the rod 54 upwardly, thus releasing the adjusting nuts 55 from the arm 56 and the spring 59 brings the latch arm 58 into position beneath the free end of the lever 39. As at this time, however, the brake portion 38 is free from the wheel 37, nothing happens. As the hide or skin 22 progresses through the machine, it passes successively between the roll 18 and the plurality of wheels 29 and then under the roll 62, which action causes the arm or lever 60 to be rotated in a counter-clockwise direction and will cause the rod 67 to be moved upwardly and, therefore, cause a corresponding downward movement of the rods 70. The spring 41 would, therefore, be free to act to rotate the lever 39 in a clockwise direction to bring the brake portion 38 into engagement with the wheel 37, were it not for the fact that the latch arm 58 holds the lever 39 in its inoperative position. The weighting machine is so designed that the average weight or thickness is indicated on the dial immediately after the end of the hide or skin 22 passes beyond the rolls 20 and 46 and immediately such hide or skin 22 has passed beyond such rolls, the roll 46 drops onto and into engagement with the roll 20, allowing a rotative movement of the bell crank lever, comprised of the arms 44 and 47, and through the connecting rod 48, causing a corresponding rotative movement of the bell crank lever comprised of the arms 42 and 59. The arm 52 being connected to the rod 54 will pull such arm downwardly and the adjusting nuts 54 engaging with the arm 56 will rotate the bell crank lever comprised of such arm 56 and the latch arm 58 in a clockwise direction, moving the latch arm 58 out from under the lever 39, whereupon the spring 41 will rotate the arm 39 so as to bring the brake portion 38 thereof into engagement with the periphery of the wheel 37 and locking the shaft 33 and, therefore, the indicating hand 34 in its set or indicating position. This indication is maintained until the end of the hide passes successively between the roll 18 and the wheels 29 and from under the roll 62 on the lever or arm 60. When this latter occurs, the rod 67 is pulled downwardly, rotating the lever 68 in a counter-clockwise direction and causing the rod 70 to engage with the outer free end of the lever 39 and moving the brake portion 38 thereof out of engagement with the periphery of the wheel 37, thus allowing the indicating mechanism, including the hand 34, to return to normal position. It will thus be obvious that the indicating mechanism of the weighting machine is locked in its indicating or set position by a hide and this setting, after being maintained for a predetermined length of time, is caused to be released by the same hide that caused the locking.

Referring now to Figs. 3 to 6 inclusive, there is illustrated a modification of the invention described with respect to Figs. 1 and 2. In these drawings the rod 67 is pivotally attached to a link or lever 75 associated with one of the frames 38, the arm or lever 60 shown in Figs. 1 and 2 being dispensed with. The form shown in these figures is intended for a faster machine than the form shown in Fig. 2, as the time during which the indication by the indicating arm 34 is maintained is shorter than in the case of such machine in Figs. 1 and 2. If we assume that the hide or skin 22 is moving along the platform 11, as in Fig. 4, and encounters and, therefore, passes between the rolls 20 and 46, the bell crank lever, comprised of the arms 44 and 47, is rotated in a counter-clockwise direction, thus pulling the connecting rod 48 to the left, as viewed in said figure, and causing the rotation of the bell crank lever, comprised of the arms 52 and 49, in a counter-clockwise direction. The rotative movement of the last named bell crank causes an upward movement of the rod 54, which will allow the bell crank lever, composed of the arm 56 and the latch arm 58, to be rotated under the influence of the spring 59 so as to bring said latch arm 58 under the free end of the lever 39 and thereby maintain the lever 39 and brake portion 38 in the position shown in Fig. 5 regardless of what may happen to the rod 70. When the forward end of the hide or skin 22 passes between the roll 18 and the plurality of wheels 29, the frames 28 are lifted, thus lifting the link 76 about the pivot point 77, causing a lifting movement of the rods 67 and a corresponding downward movement of the rod 70, thereby releasing the free end of the lever 30, which, coming immediately in engagement with the upper end of the latch arm 58, is maintained in the position shown in Fig. 6. The hide is now assumed to be passing through the machine and in engagement with the roll 46 and plurality of wheels 29, and such roll and wheels to be in their uppermost position. Immediately the butt or rear end of the hide 22 passes beyond the roll 46, such roll will drop into engagement with the roll 20 and a clockwise rotation of the bell crank levers associated therewith will take place and a downward movement of the rod 54 will take place. The adjusting nuts 55 thereof will come into engagement with the arm 56 of the bell crank lever, including the arms 56 and 58, and the latch arm 58, will, because of the rotative movement given to such bell crank lever, be withdrawn from the end of the lever 39; that is, the bell crank lever comprised of the arms 56 and 58 will again assume the position shown in Fig. 5 and the rod 50, being at this time in the position shown in Fig. 6, said lever 39 will be able to rotate in a clockwise direction under the influence of the spring 41 and the brake portion 38 will come into engagement with the periphery of the wheel 37, thereby locking the indicating hand 34 in position to indicate the average weight or thickness of the hide or skin 22. This condition will prevail and the indicating hand 34 will be locked until the butt end of the hide 22 passes beyond the plurality of wheels 29, at which time the wheels 29 will drop, coming into engagement with the roll 18 and cause a corresponding drop or lowering of the rod 67, which in turn causes a corresponding upward movement of the rods 70, thereby bringing the upper end of said rods 70 into engagement with the free end of the lever 39 and rotating the same in a counter-clockwise direction to move the brake portion 38 thereof from engagement with the periphery of the wheel 37 and thus allow the mechanism associated with said wheel to return to normal position, this including, of course, the indicating hand 34.

From the above it is obvious that my invention is applicable for attachment to, or incorporation in, a weighting machine wherein it is desirable to lock the indicating hand in a predetermined set position and for a predetermined length of time, at which time it has to be released, and in my device the locking of the mechanism in set position and the releasing thereof is controlled by the passage through the machine of the individual hide; that is, there is a locking and unlocking function controlled by each hide in succession as it passes through the machine.

While I have necessarily shown and described the preferred embodiments of my invention somewhat in detail, it is understood that I may vary the size, shape and arrangement of parts within wide limits without departing from the spirit of the invention.

Having thus described my invention, what I claim as new is:

1. In a weighting machine, the combination with an indicating mechanism for visually indicating the average weight or thickness of a hide or skin, of a brake mechanism therefor for holding the indicator in set position, and means operable by the hide or skin passing through the machine and of which the weight or thickness is indicated for releasing the brake mechanism after a length of time that is determined by the speed of operation of the machine, whereby the indicating mechanism is permitted to return to normal or inoperative position.

2. In an improved weighting machine, the combination with an indicating mechanism for indicating the average weight or thickness of a hide or skin, of a brake mechanism associated therewith, and means operable by the passage of a single hide or skin through the machine for operating the brake mechanism to lock the indicating mechanism in set position and releasing the indicating mechanism after a length of time that is determined by the speed of operation of the machine.

3. In a weighting machine, the combination with indicating mechanism for indicating the average weight or thickness of a hide or skin, of means operatively associated with the indicating mechanism for maintaining the indicating mechanism in set position and then releasing the same to allow it to return to zero or inoperative position, said means being operated to perform both functions by the same hide or skin as such hide or skin passes through the machine.

In testimony whereof, I have signed my name to this specification.

WALLACE C. WRIGHT.